(No Model.)

R. J. DE BARRIL.
ROLL HOLDER CAMERA.

No. 506,210. Patented Oct. 10, 1893.

Witnesses:—
D. H. Hayford
C. F. Sundgren

Inventor:—
Robert J. De Barril
by attorneys
Brown & Seward

UNITED STATES PATENT OFFICE.

ROBERT JOHN DE BARRIL, OF NEW YORK, ASSIGNOR OF TWO-FIFTHS TO HENRY J. LAMARCHE, MATTHEW J. LAMARCHE, AND JOHN V. LAMARCHE, OF BROOKLYN, NEW YORK.

ROLL-HOLDER CAMERA.

SPECIFICATION forming part of Letters Patent No. 506,210, dated October 10, 1893.

Application filed August 2, 1892. Serial No. 441,908. (No model.)

*To all whom it may concern:*

Be it known that I, ROBERT JOHN DE BARRIL, of New York, in the county and State of New York, have invented a new and useful Improvement in Photographic Cameras, of which the following is a specification.

My invention relates to an improvement in photographic cameras in which provision is made for making a series of exposures in rapid succession and more particularly for exposing films arranged in the form of a continuous strip or carried along by a continuous strip.

A practical embodiment of my invention is represented in the accompanying drawings in which—

Figure 1:
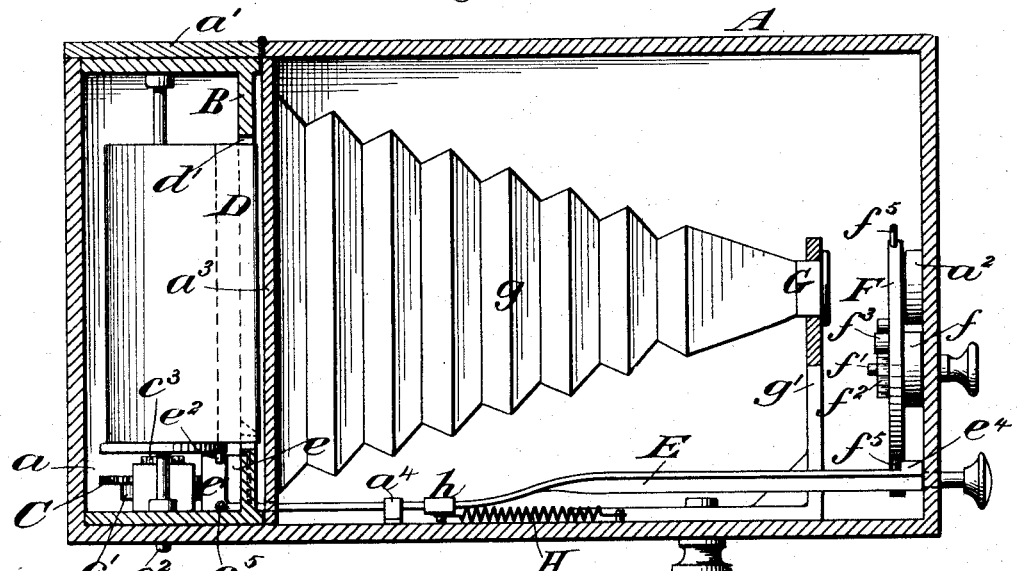
Figures 2, 3:
Figure 5:
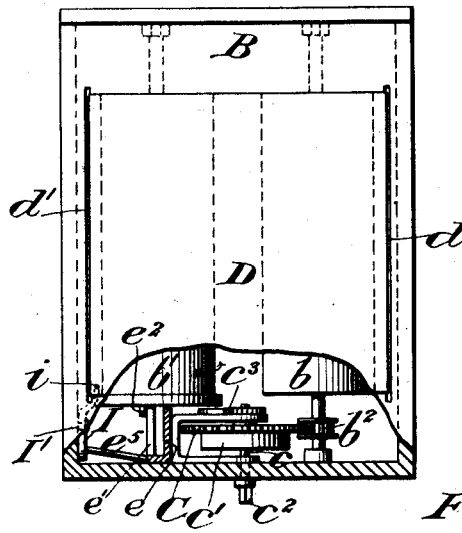

Figure 1 is a view of the box in longitudinal section, showing the interior parts in side elevation. Fig. 2 is a front view of the film holder partially broken away to show the mechanism for operating the film carrying drums or rollers. Fig. 3 is a view of the rotary shutter, looking from the inside of the camera box toward the front and showing the camera box in transverse section. Fig. 4 is a view in detail of the operating bar, and Fig. 5 is a view in detail of the puncturing device for indicating where the strip of film is to be cut intermediate of two successive exposures.

A represents the camera box provided at its rear end with a compartment $a$ for the reception of the film holding box or frame B. The top of the chamber $a$ is denoted by $a'$ and is represented as hinged to the top of the camera box A so that it may be swung open for permitting the insertion and removal of the film holding box or frame into and from the chamber $a$.

Within the box or frame B there is mounted a pair of drums or rollers $b, b'$, the former for the reception of the film after exposure and the latter for holding the supply of films. The roller or drum $b$ has a pinion $b^2$ secured on its spindle which intermeshes with a drive spur wheel C mounted on an independent arbor $c$ and actuated by a coil spring $c'$ tending to rotate it,—as is common in clock work. The arbor $c$ is provided at its outer end with a square portion $c^2$ for the reception of a winding key to wind the spring, and the ratchet and pawl mechanism $c^3$ of any well known or approved form, serves to prevent the unwinding of the spring excepting as the drum $b$ is permitted to rotate. The advance end of the strip of film is intended to be secured to the drum $b$ and the strip, represented by D, passes thence out through a slit $d$ in the front of the box B, thence over to a slit $d'$ at the opposite side of said box, thence through the slit to the supply drum $b'$. The spring mechanism puts the spindle of the drum $b$ under tension and tends to hold the film stretched smoothly over the front of the box and also tends to draw the film from the supply drum and wind it onto the drum $b$ whenever the supply drum $b'$ is permitted to rotate.

The means which I employ to regulate the movements of the drum $b'$ are as follows: A longitudinal reciprocating bar E extends from the front end of the camera box through which it projects, rearwardly to a point opposite the end of the roller $b'$, as clearly indicated in Fig. 1. At its inner end it is provided with a pair of upwardly extending lugs $e, e'$, adapted to engage a pin $e^2$ on the end of the drum $b'$. The lug $e'$ is spaced a short distance from the lug $e$, a distance sufficient for the passage of the pin $e^2$ between them and the said lug $e'$ overlaps—for a short distance—the lug $e$, as clearly indicated in Fig. 4, in which the pin $e^2$ is represented diagrammatically. The roller $b'$ has a tendency to move in the direction of the arrow (see Fig. 2) and when the operating bar E is pushed inwardly a short distance, it will permit the pin $e^2$ to slide past the lug $e'$ into contact with the lug $e$ and into position to pass between the lugs $e'$ and $e^2$ when the bar E is moved outwardly or toward the front of the camera box, which movement will free the pin from the rear edge of the lug $e$ and permit the roller or drum $b'$ to rotate and feed forward a sufficient length of film for another exposure, its rotary movement being again interrupted by the engagement of the pin $e^2$ with the lug $e'$, as represented in Figs. 2 and 4.

The same operating bar E which controls the feeding of the film strip forward also controls the making of the exposure alternately with the feeding of the strip, as follows: A rotary shutter F is caused to rotate by means of a spring $f$ connecting it with an arbor $f'$ carrying a ratchet wheel $f^2$ engaged by a holding pawl $f^3$, as is common. The shutter F is located at or near the front of the camera box and is provided with one or more openings $f^4$, in the present instance three, for admitting a flash of light through an opening the wall of which is denoted by $a^2$, in the front of the camera box, to the lens carried in the lens holder G and thence to the film exposed through the partition $a^3$ to the lens. The lens holder G is connected with the partition $a^3$ by a bellows-like diaphragm $g$, as is common, and is supported by the movable holder $g'$ for adjusting it. The rotary shutter F is provided with pins $f^5$ located thereon intermediate of the openings $f^4$, one for each opening, for the purpose of arresting the shutter F in such position as to bring the opening $a^2$ through the front of the camera box intermediate of two successive openings $f^4$ and thereby shut off the entrance of light. The operating bar E is provided with a second pair of lugs $e^3$, $e^4$ spaced apart sufficiently to permit the pins $f^5$ to pass between them and one overlapping the other in the manner similar to the arrangement of the lugs $e$, $e'$ hereinbefore referred to. The arrangement of the lugs on the operating bar E is such that when the pin $e^2$ rests in contact with the lug $e'$, the pin $f^5$ of the rotary shutter will rest in engagement with the lug $e^3$, as shown diagrammatically in Fig. 4. When therefore the bar E is moved inwardly, it will first permit the pin $e^2$ to escape from the lug $e'$ and move into engagement with the lug $e$ preparatory to the movement of the drum to feed the film forward and will then permit the pin $f^5$ to escape from the lug $e^3$ and the shutter F to rotate until the next successive pin $f^5$ comes in contact with the lug $e^4$. Such movement of the shutter will have passed one of the openings $f^4$ across in front of the opening $a^2$ and will have made an instantaneous exposure upon the film. The outward or return movement of the bar E will, as before described, permit the strip of film to feed forward for another exposure and will, at the same time, permit the pin $f^5$, to escape from the lug $e^4$ into contact with the lug $e^3$ preparatory to another exposure. The outward throw of the bar E is effected by the spring H and its inward movement is limited by the stop $h$ thereon which abuts against a supporting piece $a^4$ on the interior of the box.

To puncture the film strip at points intermediate of two successive exposures for convenience in cutting, I provide a vibrating punch I, with a point $i$ at one end and connect it at its opposite end with a pin $e^5$ on the operating rod E so that the inward movement of the operating bar E will swing the lower end of the punch I to the rear and advance its point $i$ forward to puncture the film, as indicated in Fig. 2, and when the operating bar E moves again forward for setting free the drum to feed the film, the point $i$ will be withdrawn from the film and permit it to feed without interruption. I find it convenient to pivot the punch I to the inward side of the box frame B, as shown at I', Fig. 2.

By the above construction and arrangement of parts I am enabled to make a great number of exposures in rapid succession, the time required being that simply required for the inward pressure of the bar E and the return of the finger ready for another inward pressure.

What I claim is—

1. The combination with a movable shutter, means for automatically actuating the shutter when released, a film carrier and means for automatically advancing the film carrier when released, of a spring actuated operating bar provided with releasing and arresting devices engaged with the movable shutter and film carrier for releasing and arresting the shutter and carrier alternately, under a single impulse imparted to the operating bar by the operator substantially as set forth.

2. The combination with the rotary shutter for making exposures, the winding drums for carrying the film and means for automatically rotating the shutter and winding drums when they are released, of a reciprocating operating bar provided with two sets of lugs, a pin on the rotary shutter adapted to engage one set of the lugs on the operating bar, a pin on one of the winding drums adapted to engage the other set of lugs on the operating bar, the said pairs of lugs being each arranged so as to permit the said pins to pass between them, and one lug of each pair being arranged to overlap the other of that pair to permit a preliminary movement of the shutter and film carrier in advance of their full movement, substantially as set forth.

3. The combination with a shutter, the film carrier, means for automatically advancing them when released and the operating bar for releasing and arresting them, of a vibrating punch mounted in position to puncture the film intermediate of two exposed portions, and a connection between the said operating bar and the vibrating punch for operating the punch when the bar is moved to release the shutter to make the exposure, substantially as set forth.

ROBERT JOHN DE BARRIL.

Witnesses:
FREDK. HAYNES,
D. H. HAYWOOD.